R. S. CATES.
MEANS FOR EXPANDING COMPRESSED AIR.
APPLICATION FILED MAR. 9, 1906.
912,647.  Patented Feb. 16, 1909.
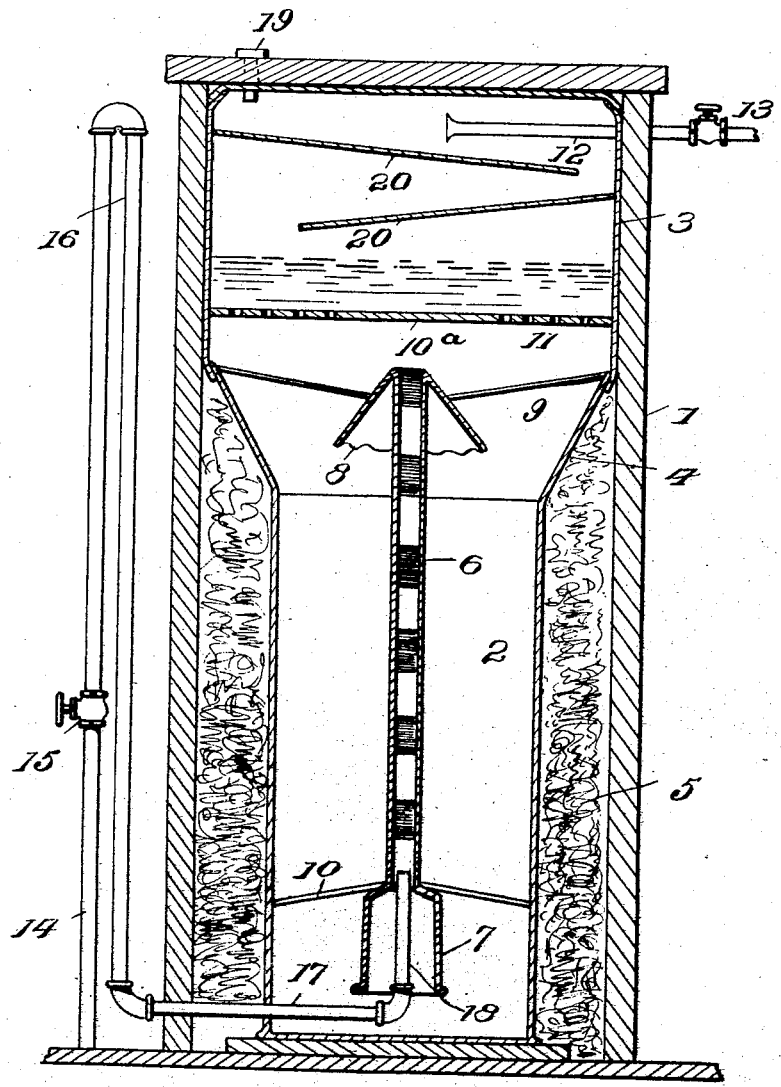
Inventor
R. S. Cates
Witnesses

UNITED STATES PATENT OFFICE.

ROBERT S. CATES, OF KINGMAN, KANSAS.

MEANS FOR EXPANDING COMPRESSED AIR.

No. 912,647.  Specification of Letters Patent.  Patented Feb. 16, 1909.

Application filed March 9, 1906. Serial No. 305,137.

*To all whom it may concern:*

Be it known that I, ROBERT S. CATES, a citizen of the United States, residing at Kingman, in the county of Kingman and State of Kansas, have invented certain new and useful Improvements in Means for Expanding Compressed Air, of which the following is a specification.

This invention appertains to means for utilizing a maximum amount of the cold produced as a result of expanding compressed air or like fluid and equalizing the resultant temperature and insuring a nearly perfect expansion of the fluid.
The invention consists of a tank or receptacle and adjunctive parts arranged therein, such as an immersed expansion pipe, hood and partition, and baffles in the upper portion of the tank above the liquid, all of novel formation and arrangement, as will appear more fully hereinafter.

For a full description of the invention and the merits thereof and also to acquire a knowledge of the details of construction of the means for effecting the result, reference is to be had to the following description and accompanying drawing, which is a vertical central section of a tank and coöperating parts located therein.
The tank 1 may be of any material and is preferably constructed of wood which is light and sufficiently thick to retain the cold and prevent penetration of the exterior heat. Within the tank or box like structure 1 is arranged a metal chamber comprising a lower reduced portion 2, an upper enlarged portion 3 and an intermediate tapered portion 4, said chamber being preferably constructed of sheet steel so as to withstand the internal pressure. The lower and tapered portions 2 and 4 of the chamber are spaced from corresponding inner portions of the walls of the tank or inclosing structure 1 and insulating material 5 fills said space and is of a nature to confine the cold and prevent the external heat penetrating the same and reaching the chamber. A stand pipe 6 is located within the lower portion of the chamber and is flared at its lower end, as shown at 7, to admit of the surrounding medium having ready access into the lower portion of the pipe 6. Expansion of compressed air takes place in the pipe 6, said compressed air being separated into sections by portions of the liquid. The part 6 may be properly designated as an expansion pipe and will be referred to hereinafter and in the claims by such term. A hood 8 is attached to the upper end of the expansion pipe 6 and constitutes a deflector, whereby the liquid thrown up out of the expansion pipe and descending will be thrown outward in all directions by striking the said hood. The liquid, as it rises in the expansion pipe 6 and is discharged vertically therefrom, strikes the solid portion 10ᵃ of the partition arranged thereover, and is caused to fall and coming in contact with the outwardly flared hood 8 is deflected outwardly in the tank or box. The stay rods 9 brace the upper end of the expansion pipe. Other stay rods 10 connect the lower portion of the air expansion pipe with the chamber.

A partition is located above the hood 8 in the lower portion of the enlarged part 3 of the chamber and comprises a central imperforate or solid portion 10ᵃ and an outer or perforate portion 11. The central portion 10ᵃ of the partition acts as a baffle to check the upward tendency of the liquid under the influence of the expanding air, thereby supplementing the action of the hood 8. The air separating from the liquid passes upward through the open or perforated portion of the partition and collects in the upper portion of the chamber and is led therefrom by means of a pipe 12 to the required point of use, said pipe being provided with a controlling valve 13 to regulate the outflow.

The supply pipe 14 leading from an air compressor, reservoir or other source, not shown, is provided with a controlling valve 15 and has a loop 16 in its length adjacent to the tank or inclosing structure 1 and approximating the height thereof so as to prevent passage of the liquid from the apparatus to the source of compressed air supply. The supply pipe 14 has a portion 17 extended into the lower part of the tank and chamber and terminating in a vertical extension 18 entering the lower flared or bell-shaped portion of the air expansion pipe. A liquid refrigerant, such as a solution of chlorid of calcium or brine, is supplied to the chamber through an opening 19 until its level reaches a short distance above the partition, thereby immersing said partition, the hood and the air expansion pipe. An air space is left in the upper portion of the chamber and is divided by baffles 20 having a staggered or alternate arrangement so as to compel the cold air to take a tortuous path. The outflow pipe 12 preferably extends into the chamber approximately to a central point.

An apparatus constructed substantially as herein specified having its chamber charged with a liquid, is adapted for operation by admitting compressed air or other fluid into the lower portion of the air expansion pipe through the extension 18 of the supply pipe by opening the valve 15. The air entering the lower portion of the pipe 6 expands and tends upward and causes the liquid in the pipe 6 to flow upward until arrested by the hood 8, while the air and liquid are outwardly and downwardly deflected, the air separating from the liquid and passing upward into the space provided in the top portion of the chamber from which it is led to the required point of use by means of the pipe 12. The liquid escaping from the upper end of the air expansion pipe is drawn downward and around said pipe to take the place of that drawn upward into the air expansion pipe by the action of the compressed air or fluid passing upward through said pipe. It will be understood that the air expanding in the pipe 6 produces cold and the liquid passing downward around said air expansion pipe is cooled to a certain extent, thereby preventing loss of cold which would occur if said liquid returned to the lower end of the air expansion pipe by ducts or passages spaced from said pipes 6. The construction is such that the maximum amount of cold produced by the expansion of the air is utilized for cooling purposes in the industrial art according to the particular adaptation of the apparatus.

Having thus described the invention, what is claimed as new is:

1. In refrigerating apparatus, the combination of a chamber adapted to receive a liquid refrigerant, an air expansion pipe arranged within said chamber and adapted to be immersed in the liquid refrigerant contained therein, means for supplying compressed air fluid to the lower end of the air expansion pipe to cause the air and liquid to pass through the said pipe in alternate separated portions, a hood attached to the upper end of the said air expansion pipe, and a partition arranged above the said hood and having a central portion imperforate and its outer portion perforated.

2. In refrigerating apparatus, the combination of a chamber having its lower portion contracted and its upper portion enlarged and adapted to receive a liquid refrigerant, an air expansion pipe located in the contracted portion of the chamber and immersed in the liquid refrigerant contained therein and open at its top and bottom, means for supplying compressed air to the lower portion of the air expansion pipe to cause the air and liquid to pass through said air expansion pipe in alternate separated portions, and a partition arranged in the upper enlarged portion of the said chamber to effect separation of the air when expanded from the refrigerant.

3. In refrigerating apparatus, the combination of a chamber adapted to receive a liquid refrigerant, an air expansion pipe located in said chamber and adapted to be immersed in the refrigerant contained therein and a pipe for supplying compressed air liquid to the lower portion of the air expansion pipe to cause the air and liquid refrigerant to pass through the said pipe in alternate separated portions, the said compressed air supplying pipe having a loop in its length to prevent passage of the liquid refrigerant from the chamber to the source of compressed air supply.

4. In refrigerating apparatus, the combination of a chamber having an outlet at its upper end and comprising a lower contracted portion and upper enlarged portion and an intermediate tapered portion, an air expansion pipe located in the lower contracted portion of the chamber and open at its top and bottom, means for supplying compressed air to the lower portion of said air expansion pipe, a hood attached to the upper end of said air expansion pipe and located in the intermediate tapered portion of the chamber, and baffles arranged in the upper enlarged portions of the chamber.

5. In refrigerating apparatus, the combination of a chamber comprising upper and lower portions of different diameters and an intermediate tapered portion, a valve outlet leading from the upper enlarged portion of the chamber, an air expansion pipe located in the lower portion of the chamber and having its lower end enlarged, a pipe extended into the lower enlarged end of the air expansion pipe to supply compressed air or fluid thereto a hood attached to the upper end of the air expansion pipe, a partition arranged above said hood and comprising a center imperforate portion and an outer perforated portion, and baffle plates arranged in the chamber above said partition and alternating with each other.

In testimony whereof I affix my signature in presence of two witnesses.

ROBERT S. CATES. [L. S.]

Witnesses:
D. FORREST METCALF,
O. C. CATES.